June 25, 1963

H. L. BROWNE ETAL 3,095,216

MECHANICAL AUTOMATIC STEP

Filed Sept. 9, 1960

HORACE L. BROWNE
ROBERT A. MYERS
INVENTORS

BY John R. Faulkner
John J. Roethel

ATTORNEYS

June 25, 1963　　　H. L. BROWNE ETAL　　　3,095,216
MECHANICAL AUTOMATIC STEP

Filed Sept. 9, 1960　　　　　　　　　　　　　　　2 Sheets-Sheet 2

HORACE L. BROWNE
ROBERT A. MYERS
INVENTORS

BY John L. Faulkner
John J. Roethel

ATTORNEYS

United States Patent Office 3,095,216
Patented June 25, 1963

3,095,216
MECHANICAL AUTOMATIC STEP
Horace L. Browne, Dearborn, and Robert A. Myers, Garden City, Mich., assignors to Ford Motor Company, Dearborn, Mich., a corporation of Delaware
Filed Sept. 9, 1960, Ser. No. 55,056
4 Claims. (Cl. 280—166)

This invention relates to motor vehicles and more particularly to an auxiliary step for such vehicles.

The bodies of buses, trucks and similar motor vehicles are frequently so constructed that their floor levels are a considerable distance above the ground. It is, therefore, desirable and oftentimes necessary that a step be provided to facilitate ingress and egress to and from the vehicle. In its simplest form the step may comprise a rigid structure located interiorly or exteriorly of the vehicle body contiguous to the door opening. If located interiorly the step requires an undesirable and frequently dangerous depression or stair well on the vehicle floor. And, if located exteriorly, the step supporting structure presents an undesirable appendage which increases the external dimensions of the vehicle. It has been recognized that a movable or, preferably, a foldable step structure is required to overcome the objections to the rigid or integral step structure. Accordingly, it is an object of the present invention to provide an improved foldable step structure which is automatically positioned to facilitate entry and exit when the vehicle door is opened. The step is also automatically positioned out of the way beneath the floor of the vehicle body when the door is closed.

Another object of this invention is to provide an actuating mechanism for the step in which the moving parts are so constructed and arranged so as to reduce the possibility of high friction in the system which might result from corrosion of the parts.

A further object of this invention is to provide an actuating mechanism which will not "feed back" the loads imposed upon the step in its operative position to the vehicle door.

The above results are obtained with this invention by supporting the step from the underside of the vehicle floor board in such a manner that it may swing from the operative position upwardly and inwardly under the floor board to a storage position. The movement of the step is controlled by a lever system which is connected to be actuated by the opening and closing of the vehicle door.

Further objects and advantages of this invention will become more apparent as the description of this device proceeds, particularly in reference to the drawings, wherein.

Figure 1:
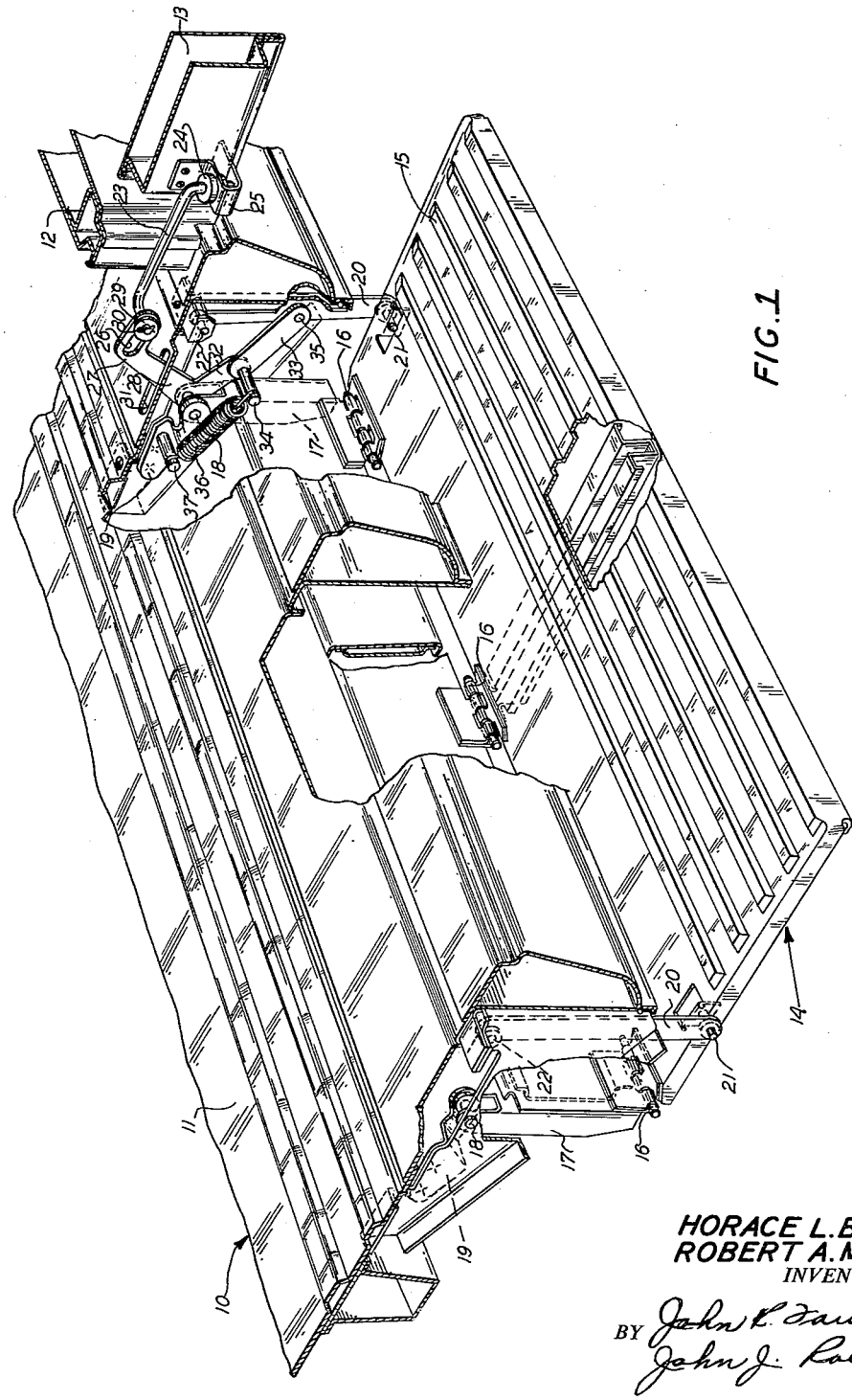
FIGURE 1 is a perspective view of a portion of a vehicle body incorporating this invention with parts broken away to show more clearly the construction.

Referring now in detail to the drawings, there is shown generally at 10 a vehicle body consisting of a floor board 11 and a side panel structure 12 to which a door 13 is conventionally hinged for swinging movement from an open to a closed position. Suspended beneath the floor board 11 in contiguous relation to the door opening is the foldable step assembly, generally designated 14, embodying the present invention. The step assembly 14 comprises a tread panel or step hinged at its rear edge by ordinary strap hinges 16 to a riser 17. The riser 17 is pivotally suspended at its upper edge from pivot pins 18 which are rotatably journalled in suitable brackets 19 secured to the underside of the vehicle floor board.

The riser 17 forms one support link of a linkage system supporting the tread panel or step 15 for bodily shiftable movement from an inoperative position beneath the vehicle floor board to an operative position, as will be more fully explained. In addition to the riser 17, additional support links 20 are positioned outwardly of the riser to support the tread panel or step 15. These links 20 are located one at each side of the step and are pivotally suspended from pivot pins 22 carried beneath the floorboard 11. The links are pivotally connected at their lower ends to the tread panel or step by pivot pins 21.

The mechanism for actuating the step assembly is located at the side of the step assembly nearest the hinge axis of the door and consists of a rod 23 secured at one end thereof to the door 13 by means of grommet 24 held in bracket 25 which is, in turn, suitably secured to door 13. The other end of the rod 23 is offset and coacts with slot 26 formed in the arm 27 of bell crank 28. Rod 23 is maintained in slot 26 by means of washer 29 and cotter key 30. The arm 27 of bell crank 28 extends through slot 31 formed in the floor board 11. Bell crank 28 is mounted below the floor board for pivotal movement about pin 18. The other arm 32 of bell crank 28 is pivotally connected at its end to one end of link 33 by pin 34. At its other end link 33 is pivotally connected to link 20 intermediate the ends thereof as by pin 35. A tension spring 36 is connected between pin 34 and a pin 37 suitably secured to one of the brackets 19.

Figure 2:
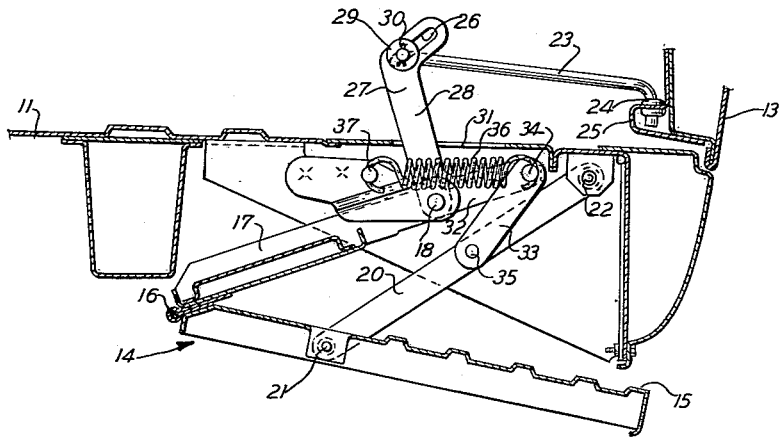
FIGURE 2 is a cross-sectional view showing the step in its retracted position; and, FIGURE 3 is a cross-sectional view showing the step in its operative position.

In operation, as the door is opened from the closed position shown in FIGURE 2 the offset end of rod 23 traverses slot 26 in arm 27 of bell crank 28. After the end of the rod has been brought into abutment with the end of slot 26, bell crank 28 is pivoted in a clockwise direction about pin 18. It should be noted that grommet 24 allows sufficient relative motion between the rod 23 and the door during this action. As bell crank 28 pivots, motion is transmitted to link 33 causing it to pivot at each of its ends and, in turn, cause link 20 to pivot about pin 22 in a counterclockwise direction. The action of link 20 upon step or tread panel 15 causes the step assembly to swing into the operative position, shown in FIGURE 3. Riser 17 causes the step to assume a position which is substantially parallel to the floor board 11 and serves to hold the step level as loads are applied to the step.

Figure 3:
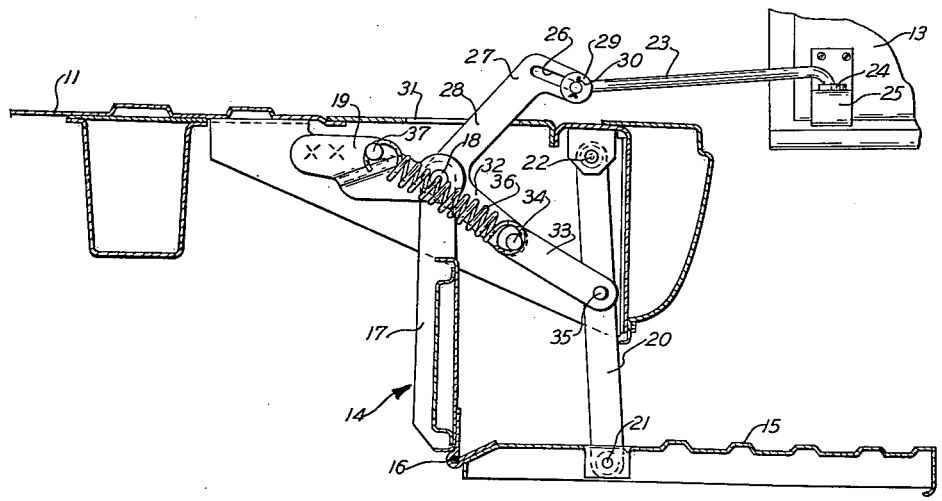

It will be noted from an inspection of FIGURES 2 and 3 that arm 32 of bell crank 28 and link 33 function as toggle links because of the location of their pivot points. When step assembly 14 is in the operative position (FIGURE 3), pin 34 lies below a line connecting pins 18 and 35. This overcenter relationship prevents loads imposed upon step 15 from being transmitted to door 13.

When the door is closed, rod 23 again traverses slot 26 and causes the step assembly 14 to move into the storage position in a manner reverse to that above described. The spring 36 acts to assist in the closing movement and thus no extra force is required to close the door.

As has been noted, rod 23 must traverse slot 26 before the step is actuated. This "lost motion" in conjunction with the toggle mechanism previously described prevents any load on the tread panel when in its operative position from feeding back into the door mechanism. This slot is also located above the floor board in the vehicle interior so that it will not be exposed to the elements causing rust. In this way the device will continue to operate trouble-free for a period of years.

It will be understood that the invention is not to be limited to the exact construction shown and described but that various changes and modifications may be made without departing from the spirit and scope of the invention, as defined in the appended claims.

We claim:

1. In a motor vehicle, a vehicle body, a door supported for swinging movement by said body, a movable step, linkage means operatively connected to said step and to said body allowing swinging movement of said step from an operative to a storage position, a first link pivoted at one end to said step and at the other end to said body, a bell crank pivotally supported by said body and having an extending arm, a second link pivotally connecting said arm and said first link, and an actuating rod operatively connected at one end thereof to said door for movement therewith, the other end of said rod being operatively connected to said bell crank, the point of pivotal connection between said second link and said arm lying below a line connecting the point of pivotal support of said bell crank and the pivotal connection between said second link and said first link when said step is in its operative position.

2. In a motor vehicle, a vehicle body, a door supported for swinging movement by said body, a movable step, linkage means operatively connected to said step and to said body for swinging movement of the former from an operative to a storage position, a first link pivoted at one end to said step and at the other end to said body, a bell crank pivotally supported by said body and having an extending arm, a second link pivotally connecting said arm and said first link, and an actuating rod operatively connected at one end thereof to said door for movement therewith, the other end of said rod being connected to said bell crank by means of a lost motion connection, the point of pivotal connection between said second link and said arm lying below a line connecting the point of pivotal support of said bell crank and the pivotal connection between said second link and said first link when said step is in its operative position.

3. In a motor vehicle, a vehicle body, a door swingably mounted on said vehicle body, a movable step, means supporting said step for swinging movement from an operative position upwardly and inwardly to a storage position under said vehicle body, and a lever system operatively connected to said door and said step controlling movement of said step from its operative to its storage position in response to movement of said door, said lever system including a first link having a first pivotal connection with said vehicle body, a second link having a first pivotal connection with said means supporting said step, and means pivotally connecting said first and said second links, said last mentioned means being upon one side of a line joining the first pivotal connections of said links when said step is in its operative position and upon the other side of said line when said step is in its storage position.

4. In a motor vehicle, a vehicle body, a door swingably mounted on said vehicle body, a movable step, linkage means pivotally connected to said vehicle body and said step controlling swinging movement of said step upwardly and inwardly from an operative position to a storage position under said vehicle body, and a lever system operatively connected to said vehicle door and said step controlling movement of said step from its operative to its storage position in response to movement of said door, said lever system including a first link having a first pivotal connection with said vehicle body, a second link having a first pivotal connection with said linkage means, and means pivotally connecting said first and said second links, said last named means being upon one side of a line connecting the first pivotal connections of said links when said step is in its operative position and upon the other side of said line when said step is in its storage position.

References Cited in the file of this patent

UNITED STATES PATENTS

| | | |
|---|---|---|
| 1,471,972 | Miller | Oct. 23, 1923 |
| 2,118,557 | Hamilton | May 24, 1938 |
| 2,125,085 | Pool | July 26, 1938 |
| 2,286,706 | Austin | June 16, 1942 |

FOREIGN PATENTS

| | | |
|---|---|---|
| 18,094 | Great Britain | of 1914 |